United States Patent [19]

Rogols et al.

[11] 3,857,987

[45] Dec. 31, 1974

[54] WET MILLING OF COARSE GROUND WHEAT AND OTHER CEREAL GRAINS

[75] Inventors: Saul Rogols, Circleville; Edward J. Hueckel, Columbus; John W. Salter, Westerville, all of Ohio

[73] Assignee: A. E. Staley Manufacturing Company, Decatur, Ill.

[22] Filed: Dec. 26, 1973

[21] Appl. No.: 428,558

[52] U.S. Cl................. 426/436, 426/481, 426/807, 426/458, 426/462, 426/212, 426/215, 426/518, 260/123.5, 127/68
[51] Int. Cl. .............................................. A23j 1/14
[58] Field of Search ........... 426/343, 458, 436, 152, 426/807, 385, 373, 481, 462, 459, 482, 483, 212, 215, 518; 260/112, 233.3, 223.5; 127/68

[56] References Cited
UNITED STATES PATENTS

| | | | |
|---|---|---|---|
| 2,358,827 | 9/1944 | Rakowsky et al.................. | 426/373 |
| 2,797,212 | 6/1957 | Miley et al.......................... | 426/343 |
| 3,630,754 | 12/1971 | Wayne................................ | 426/481 |
| 3,734,752 | 5/1973 | Headley............................. | 426/481 |
| 3,788,861 | 1/1974 | Durst.................................. | 426/385 |
| 3,957,632 | 10/1960 | Sullivan et al. ..................... | 426/481 |

FOREIGN PATENTS OR APPLICATIONS

| | | | |
|---|---|---|---|
| 614,644 | 2/1961 | Canada.............................. | 426/481 |
| 602,413 | 7/1960 | Canada.............................. | 426/343 |

*Primary Examiner*—Wilbur L. Bascomb, Jr.
*Assistant Examiner*—David Edwards
*Attorney, Agent, or Firm*—Howard J. Barnett; Charles J. Meyerson

[57] ABSTRACT

An improved wet milling process for obtaining starch, vital gluten and a balanced protein bran, germ and fiber animal feed from coarse ground wheat without acid steeping, alkali treatment, or dry roll milling of the grain kernels. The coarsely ground kernels are directly formed into a coarse grain batter using only fresh water with no additives, and the prime grade starch is washed away from the vital gluten in the coarse batter in the natural pH range of 3-6 for both starch and gluten with no denaturing of the gluten due to salt, alkali, or other chemical additives.

Dewatered bran germ and fiber are collected together, and the mixture has a relatively high level of nutritive protein and cellulose bulk which makes it a well-balanced animal feed. The wheat kernel is carefully fractionated to avoid physical, chemical and nutritional damage to each of its valuable components, and the pH of the recirculated wash waters remains below 6, more specifically about 5.8, to give a yield of about 53% by weight starch; 9% vital gluten; and 29% protein containing bran, germ and fiber. The protein values for the vital gluten so obtained are at least 80% by weight. The dewatered bran, germ and fiber obtained from this process have the following approximate analysis which is considered an ideal balance for animal feeds:
at 9.4% protein
2.8% fat
3.77% ash
47.9% starch (carbohydrate)

12 Claims, No Drawings

WET MILLING OF COARSE GROUND WHEAT AND OTHER CEREAL GRAINS

BACKGROUND OF THE INVENTION

In the past, there has been a government subsidy system to support wheat prices. A rebate system to the makers of non-food wheat derived products encouraged the processing of all usable by-products resulting from the processing of wheat flour. A money payment per ton was paid for the secondary processing of one wheat flour by-product known as "second clears," or "tailings," into non-food products, such as starch. The principal miller, whose primary goal is to make products such as wheat germ, vital wheat gluten and prime grade starch for food use, often sells the waste stream to a secondary starch processor who then recovers additional wheat starch and other wheat flour components remaining in the waste stream. Because the secondary processor sold his starch for industrial use, he recovered a portion of a payment made to the Federal government by the miller who primarily made food products.

The main purpose of the subsidy program was to support wheat prices, and to develop more industrial uses for wheat, and thereby cut into a substantial wheat surplus built up over a period of abundant wheat growing years in the United States and Canada. A secondary effect was to cut down on the sewage wastes emanating from wheat milling operations. Profitability for the processing of "second clears" was greatly improved by the government subsidy, and since there is now a shortage of wheat due to massive exports, the subsidy program was abruptly discontinued, leaving the secondary processors with substantial equipment investment and a much less profitable product. A somewhat similar development occurred during the second world war when corn became in short supply, the corn wet millers were left with excess wet milling capacity. At that time, various suggestions were made for processing less scarce raw materials (wheat and sorghum) in the corn wet milling equipment. Efforts in that direction dwindled and disappeared with the reappearance of bumper corn crops, for which the wet milling equipment was designed.

We have now developed a process for wet milling of cereal grains, particularly wheat, in which all of the equipment used by the secondary processor can be used as part of the necessary equipment to process wheat directly from the whole grain kernel at an attractive level of return for the added product yields so obtained. These desirable products include vital wheat gluten, prime grade starch and an excellent quality bran, germ and fiber blend which can be used as a well balanced and highly nutritious animal feed.

DESCRIPTION OF THE PRIOR ART

Many attempts have been made in the past to optimize the processing of wheat into its components. These components include: gluten, starch, fiber and germ, as well as subdivisions of these groups, including protein, ash, fats and oils. Most of these efforts were not of long duration, either because they were uneconomical, or the gluten became denatured, and no longer useful in human food. The efforts were not seriously pushed until a world shortage of protein created a pressing need to utilize all available sources of protein as efficiently as possible.

Herman Barker described a process for obtaining gluten and starch from wheat in his U.S. Pat. No. 399,727, issued Mar. 19, 1889. Barker ground the wheat grain, added water and pushed the resulting paste through perforated plates. The threadlike noodles dropped into water, or a carbonic acid bath, and were agitated. The gluten settled, and was collected, and the starch remained suspended long enough to draw it off to a second settling tank. No disclosure was offered as to the starch or gluten recovery rates, and it is believed they were quite low. There is no detail as to the granulating or pulverizing of the wheat other than that it was made into a "flour." This implies a fine grind.

About thirty years later, Hiram C. Holden described a process for obtaining starch by air frothing or foaming technique. U.S. Pat. No. 1,221,990 issued Apr. 10, 1917, describes the air frothing of a crude starch liquor (wheat, corn, rye, etc.) which contained a mixture of starch, gluten, fibrous material and other impurities. The foaming or frothing action was said to remove the gluten, fibrous material and impurities and leave only the starch in the liquor. To facilitate the process, some acid or alkali could be added to the crude liquor, causing the gluten and fiber to swell and be more readily separated with the froth. No recovery rates are disclosed, and it is suspected that the process was inefficient. The valuable gluten was not separated from the fibrous material, but was apparently sold with it as animal feed. Obviously, the value of gluten was much less than in today's market, and its importance as a source of protein in human nutrition was apparently not fully appreciated.

Air agitation of a wheat batter was described in U.S. Pat. No. 2,453,310 issued Nov. 9, 1948 (filed in 1943). Edsall et al. described lightly grinding grain from which the bran had already been removed. Sufficient water was then added in a dough mixer to form a batter, which was then delivered to an air agitation chamber where additional water was added at a ratio of approximately 1 to 2 parts water to each 2 parts of batter. This amounted to about 4 to 8 gallons of water for each 56 pounds of ground grain. Air was then injected into the batter in the agitation chamber to separate the major part of the starch from the gluten by air agitation or frothing. Meantime, the gluten settled out, and was recovered as vital gluten. There is no mention of recovery rate, nor is there any description of the nutritive value of the animal feed obtained by a conventional dry process.

U.S. Pat. No. 2,961,353 issued Nov. 22, 1960 describes an alkaline process for separating gluten and wheat starch from wheat flour. In this process, the dough is made from equal parts wheat flour and water, allowed to stand 15 minutes, and then the dough was washed with water until the wet weight of the gluten is more than two-fifths of the original wheat flour. The wet gluten was then vacuum dried and ground. The pH for this process is given as between 6.4–8.5, with 6.8–7.2 preferred. The reference does report gluten recovery efficiency, and states that the total yield of gluten diminishes at pHs higher than 7.2, while 7 pH is stated to be optimum. Sodium hydroxide, potassium hydroxide, sodium carbonate, sodium bicarbonate, calcium hydroxide, etc. are suggested as basic organic compounds which may be used to increase the pH of the dough. It is believed that the "wheat flour" used by Carlson et al. following this reference is of the conventional type, obtained by dry milling, and that the bran and fiber have already been removed.

There were many intervening disclosures directed to the wet-milling of wheat, but all of these proposals included a steeping step using $SO_2$ or a similar steeping agent. The steep periods ranged from 3–18 hours, and it is believed the gluten was devitalized in each of these methods, thereby defeating one of the main objectives of the subject wheat processing method, that purpose being the high yield of vital wheat gluten. A secondary, but important benefit, is the well-balanced animal feed product obtained from the subject wet-milling process.

Erik Plaven suggested a method for separating starch and gluten from a wheat flour in his U.S. Pat. No. 3,669,739, issued June 15, 1970. His process commences with wheat flour, and there is no description of a bran or fiber fraction. No details are given concerning the fineness of the wheat flour used, and it is not suggested that a coarsely ground grain could be treated in the same apparatus, thereby eliminating the prior bran and fiber separation steps.

There have been several published articles by Pillsbury Company, Minneapolis, Minn. and Far-Mar-Co., Inc., Hutchinson, Kan., both of which allude to new wheat wet processing methods, but none of these publications give sufficient detail to enable evaluation and comparison of the respective processes to the process described herein. The Pillsbury announcements indicate that fairly elaborate equipment may be required in their wet milling process, and the Far-Mar-Co., Inc. disclosures indicate their work is still in the experimental stage, although it also apparently involves some wet-milling technique.

The subject of wheat processing is also described in considerable detail in the recent publication edited by Y. POMERANZ, entitled *WHEAT: Chemistry and Technology*, Vol. III (Revised), American Association of Cereal Chemists, Inc., St. Paul, Minn. (1971). Excellent description of the wheat kernel morphology is set forth there, including an exhaustive bibliography of published literature on wheat milling. It is believed that this work reflects fairly current commercial practices in wheat processing, and although there is a clear appreciation in this reference for the advantages to be realized in effective and simple wheat milling, there is no disclosure of wet milling of wheat.

SUMMARY OF THE INVENTION

Contrary to what appears to be the current trend in cereal grain processing, the subject invention simplifies the procedure, realizing considerable economies by eliminating processing steps previously thought to be necessary. It is recognized that the vital gluten recovery is "vital" to the success of any future wheat milling process, and this method is geared to that requirement.

A new, improved wheat wet milling process using no added salt or alkali is here disclosed. A critical and important feature of this process, and a key to the high recovery rate for both vital gluten and prime grade starch, is the coarse cereal grind employed, followed immediately by a carefully controlled dough forming and washing procedure which effectively facilitates separation of the bran, fiber, vital gluten and the starch components of the wheat kernel at a surprising level of efficiency.

The wheat kernels are prepared using a Micro-Pulverizer Hammer-mill having a 0.046 inch slot (or similar equipment so that about 95% of the coarsely ground grain will pass through a No. 14 mesh screen; 80% passes through a No. 20 mesh screen; and 50% passes through a No. 45 mesh screen. This coarse grind, by the method chosen, actually results in large lumps or fragments of starch, gluten, bran and fibers, and upon close examination of the cracked grain, the intact germ particles can be observed. These germ particles subsequently separated with the bran and fiber fraction, and are believed to contribute the desirable protein and oil levels of the animal feed obtained.

A significant and surprising discovery which forms part of this invention is the direct step of forming a dough from the coarsely ground grain without the addition of any salt or alkali, using only water at about a 1:1 ratio of cracked wheat to water. The dough is formed in a ribbon blender or similar dough mixer for about one half hour, and then allowed to sit for about 15 minutes, to develop a moderately firm consistency.

The dough is then subjected to kneading and washing using a specially designed auger washer described below, or conventional Martin batter process equipment, and about eight recycled water washes. The main differences from the conventional batter process are:

1. pH is about 3–6;
2. no salts or alkali are added;
3. the starch fraction contains fiber, bran, and germ which is further separated from the starch and blended to form a nutritional animal feed;
4. the gluten obtained is a high yield (about 12%) of vital gluten having a protein level above at 80%. The gluten product is vacuum oven dried, flash dried or otherwise dried (without devitalizing it) for use in human foods;
5. the dough or batter is successfully formed from a very coarsely ground wheat grain, not previously subjected to bran removal, or other treatment; and
6. there is no substantial quantity of starch fragments, and the germs are removed substantially intact because of the pulverizing (grinding) method employed.

The method of the invention simplifies the processing of wheat for food and non-food uses, including animal feeds, and the resulting starch, vital gluten, and fiber-bran-germ animal feed products are of excellent quality. The bran has been little disturbed by the processing. The germ contributes excellent nutritional value to the animal feed, along with the fiber, because the processing does not denature the nutrient contained in these wheat components. Allowing the batter to seek a natural pH level insures the maximum yield of vital gluten, at the highest protein levels. The prime grade starch so obtained contains a high percentage of intact whole starch granules and a minimum of broken granules or starch fragments. The prime grade, native colloid wheat starch slurry obtained may be subjected to hydrocyclonic separation to separate a large granule portion which is useful as a protective stilt material in microencapsulated ink coatings used in carbonless paper.

DETAILED DESCRIPTION OF THE INVENTION

The following detailed description is the presently preferred method for carrying out the invention. In most instances, commercially available equipment is used. The auger washer, which is believed to be particularly suited for this wheat wet milling process, was designed by J. W. Salter of Westerville Ohio, and will be described in more detail below. In most cases, alternative equipment could be used to practice the invention. The important difference is that most of this equipment is used in a manner which is somewhat different from that expected.

The following outline shows the presently preferred method for carrying out the process of the invention:

OUTLINE OF CEREAL GRAIN WET MILLING PROCESS

1.

Coarse grind wheat to following specifications:

| 95-99% | 80-94% | 44-56% |
|---|---|---|
| Pass through No. 14 mesh screen | Pass through No. 20 mesh screen | Pass through No. 45 mesh screen |

The presently preferred grinding apparatus is the "Micro-Pulverizer" hammermill manufactured by Micro Pul Division, United States Filter Co., Summitt, N.J. A 0.046 inch arcuate screen is used to limit the largest particle size in the grind. Other grinding apparatus can be used, such as:
 a. Jeffery Mill — Jeffrey Manufacturing Co., Columbus, Ohio,
 b. Buhrstone Mill — Chas. Ross & Son Co., Hauppage, N.Y.,
 c. Fitzmill — Fitzpatrick Company, Elmhurst, Ill.

The main pulverizing action should be a gentle, impact type action to avoid fragmenting the starch granules excessively. It has been observed that the germs are separate and discrete particles, visible to the unaided eye when the "Micro-Pulverizer" hammermill is used. The knife shearing action of the Fitzmill may be less desirable.

2.

The coarsely ground grain is then mixed with equal parts water on a weight basis to form a moderately firm dough. The total mixing time is about one half hour, and there can be some minor variation in the mixing time and the amount of water added. From about 40-60% by weight water can be used. A conventional dough mixer or ribbon blender may be used to form the wheat dough. A "Co-kneader," made by Baker-Perkins, Inc., Saginaw, Mich. is satisfactory; a Strong-Scott Co. (Minneapolis, Minn.) ribbon blender will also serve this purpose. After the dough is formed, it is allowed to sit for about 15 minutes.

3.

After the dough has been formed, it is transferred to a device for washing the starch, bran, germ and fiber from the gluten. A low speed paddle mixer may be used for this purpose. The dough is continuously worked while being washed with water to remove the starch, fiber, bran and germ from the gluten. At present, eight water washes have been found to be effective in separating the other components from the gluten. The wash water is preferably recirculated after the separated bran, fiber, germ and starch are removed.

A washing device which is particularly useful in the above gluten separation procedure is a screw washer designed by J. W. Salter, Westerville, Ohio. This device comprises an inclined trough, about 7 feet in length, and housing two counter-rotating augers which extend the length of the trough. The trough has a water inlet at the upper end, and a wash water outlet at the lower end. There is a dough inlet at the lower end, and a gluten outlet at the upper end of the trough. The long axis of the trough, with its side-by-side augers, is inclined 30° to the horizontal. The augers rotate upwardly and in toward each other, and have their respective blade flights arranged accordingly to urge the gluten around and upwardly between the augers to facilitate uphill travel of the gluten as it is being sliced, chopped and finely worked while it is being washed to remove all bran, fiber, germ and starch as the gluten rope forms and travels up the washing apparatus against the wash water stream. The augers are driven at about 56 r.p.m. by a three horsepower motor. The separated gluten is cut and gathered and transported from the washing device to a drying means, which may be a flash dryer, a vacuum dryer, or some similar drying means which will not devitalize the separated gluten. Barr and Murphy, Ltd., London, England designs pneumatic ring drying systems (flash dryers) which are specifically tailored to the conditions required.

4.

The starch, bran, germ and fiber stream from the washing device is then screened to remove bran, germ and fiber from the starch. A ROBALL shaker having a 17XX screen has proved effective for this purpose. The ROBALL is available from J. H. Day Company, Cincinnati, Ohio. Other conventional screening devices may also be used for this purpose. The bran, germ and fiber fraction is then collected and dried, and used as an animal feed. The animal feed so produced has analyzed as being highly nutritional, and has a desirable balance of fat, protein and carbohydrate.

5.

The starch which passes through the ROBALL shaker is then subjected to centrifuging action to remove all remaining low grade starch fragments and impurities from it. A Merco, disc-type centrifuge, Model B-12, made by Dorr-Oliver, Inc., Stamford, Connecticut, can be used to separate the remaining impurities from the starch to produce a prime grade wheat starch, and a "B-starch" stream. Fresh water is used in the Merco centrifuge, and the resulting prime grade wheat starch slurry can then be subjected to hydrocyclonic separation to obtain a large granule starch useful in carbonless paper coatings, and a small granule starch that has a number of food uses and industrial uses. The hydrocyclones preferred are Doxie type, made by Dorr-Oliver, Inc., Stamford, Connecticut.

6.

Whether the hydrocyclone step is included or not, the final steps for the starch separation are filtering and drying. Conventional filtration and drying equipment may be used. An acceptable moisture level in the dried starch may range up to about 14%. There can be reasonable variations in the above steps, depending on particular desires. For example, the soluble proteins and soluble sugars (about 4.6% by weight of the total) may be collected, too. Calcium hydroxide may be used to aid in precipitation of these water soluble proteins and sugars, which have a number of uses in foods and in baking.

7.

It should be carefully noted that no salt or other additive other than water is introduced to the batter or the gluten throughout the process. The temperature is as nearly normal (about 70°–95°F.) as possible. The pH remains in the range of about 3–6, which is the natural acidity level for wheat. The pH stays near the isoelectric point of the starch and gluten, and therefore the gluten retains its vital nature throughout the processing. The special flash drying technique used to dry the gluten insures that it will not be devitalized by sudden temperature increase, as well as alkaline pH. Alkaline pH conditions also hinder the formation of the gluten. It is important that the dry wheat kernels be coarsely ground first, and then made directly into a dough, including the coarse particles. Physical damage to the starch granules is minimized, no salts or other chemical additions are made, and the resulting yields of vital gluten, prime grade wheat starch and a well-balanced, highly nutritional animal feed are increased substantially over prior wheat milling processes. The dough-forming protein level in the vital gluten is at least 75% by weight of the gluten fraction, and, in most instances, more than 80%. The protein level of the animal feed is about 9.4%, and there is also about 2.8% fat; 3.8% ash; 47.9% starch; 0.25% calcium; and 0.05% phosphorus.

The conventional techniques and equipment for making dry milled wheat flour are not considered suitable for the subject method. Roll milling of the wheat tends toward too fine of a grind, and hinders the separation of the wheat fractions because the gluten, starch, germ and fiber become too initimately mixed together.

The analysis for two different ground wheat grain samples is set forth below in Table I. These samples were both ground on a Micro-Pulverizer Hammermill, but using two different arcuate slotted screen openings: No. 1 was ground with 0.046 inch slotted screen openings; and No. 2 was ground with 0.028 inch slotted screen openings. When these samples were washed generally as described, but using laboratory equipment, the yields were as follows:

Table 1

|  | % Yield | | % Protein | | % Fiber | | % Starch | |
| --- | --- | --- | --- | --- | --- | --- | --- | --- |
| Grind Sample | No. 1 | No. 2 | No. 1 | No.2 | No. 1 | No. 2 | No. 1 | No. 2 |
| Gluten | 11.0 | 9.1 | 79.8 | 78.6 | 0.73 | 1.37 | 9.3 | 20.6 |
| Starch | 57.4 | 53.6 | 0.88 | 0.85 | 0.11 | 0.16 | 98.5 | 98.3 |
| Fiber | 23.1 | 27.8 | 13.17 | 13.60 | 17.7 | 14.1 | 25.4 | 21.8 |

It has been discovered that a pH from about 3 to 6 during washing of the whole grain gives the optimum yields of starch and vital gluten. At pH greater than 7, the yield of vital gluten begins to fall off significantly. Starch yields are also improved with acid (natural) pH levels. The average yields, dry basis, using the method of this invention are:

starch      57–59%
    gluten      10–13%
    fiber       22–23%

The balance of the grain kernel includes water soluble protein and carbohydrates, such as pentosan sugars, which are carried off in the wash waters. Various methods, such as reverse osmosis concentrating techniques, can be used to recover these water soluble fractions from the wash streams.

The importance of particle size was particularly evident with Grind Samples No. 1 and No. 2 above. Sample No. 1 gave better yields of gluten and starch, and was much coarser than No. 2 (See No. 45). The screen analysis for these samples were:

|  | % Through | | |
| --- | --- | --- | --- |
|  | No. 14 | No. 20 | No. 45 |
| No. 1 (.046" slotted) | 99 | 94 | 44 |
| No. 2 (.023" slotted) | 98 | 94 | 69 |

Three grinds which gave even higher yields of starch are characterized below:

Table 2

| Screen Size No. | % Through Sample | | |
| --- | --- | --- | --- |
|  | A | B | C |
| 14 | 97 | 99 | 100 |
| 20 | 84 | 95 | 99 |
| 45 | 56 | 73 | 89 |
| 100 | 31 | 46 | 68 |
| 140 | 23 | 35 | 56 |
| 200 | 17 | 25 | 32 |

Sample C ground wheat as set forth above gave a yield of 66% by weight starch; 9% gluten and 17% fiber. The remaining 8% is believed to have been water soluble protein and carbohydrate.

In a somewhat coarser grind (Sample B), the recovery of vital gluten improved, and an even coarser grind (Sample A) showed further improvement in gluten recovery, as set forth below in Table 3.

Table 3*

|  | Yield % Sample (TABLE 2) | | |
| --- | --- | --- | --- |
|  | A | B | C |
| Starch | 58 | 64 | 66 |
| Gluten | 12 | 10 | 9 |
| Fiber | 22 | 16 | 17 |

* Note: the yields are expressed as a percentage (dry basis) of the starting material.

The best protein level for recovered gluten was Sample A, which analyzed at 80% protein; 6.0% starch and 0.9% fiber. Sample B and C gluten protein were also above about 75%, which is considered an excellent gluten separation protein level. The starch fraction analyzed above 96% starch in all cases, and improved up to about 98.9% starch with the coarsest grind, Sample A, and a steady reduction in protein from 0.91% (Sample C) to 0.49% (Sample A).

The conclusion to be drawn is clear, with successful starch/gluten/fiber separation, it is what you don't do that counts. There are about seven cardinal don'ts for the success of the subject wet separation method:
1. Don't grind the grain too much;
2. Don't add salts or alkali;
3. Don't add too much water in forming batter; about 50—50 mix is fine;
4. Don't soak batter too long before commencing gluten/starch separation washes;
5. Don't alter pH from the natural acid level of the batter;
6. Don't separate germ, fiber and bran, simply dry. It makes an excellent animal feed containing balanced nutrient level as is; and
7. Don't heat gluten excessively when drying. Best drying is flash drying, vacuum drying, or some means with lower temperature and least possible heat energy input.

Of the above, the most important, and the least obvious "don'ts" which seem contrary to the main current of the prior art known to us are the coarse grind level and the natural pH levels.

This invention provides a simpler and more efficient process for wet processing of coarsely ground grains such as wheat for recovery of prime grade starch, vital gluten, and a highly nutritious mixture of fiber, bran and germ which is used as an animal feed. The method is characterized primarily by the technique of only coarsely grinding the grain, making a natural batter directly from the coarsely ground grain with no intermediate steeping steps, pH adjustments or chemical additions of any kind. Only water is added to separate the dough into its starch, vital gluten, and bran-germ-fiber fractions. The vital gluten is flash dried, or dried by some means that does not alter its nutritional value for use in human foods such as dry breakfast cereals and baked goods.

We claim:

1. A process for recovering starch, vital gluten, and a nutritious mixture of bran, germ and fiber from cereal grains, the steps comprising:
A. Dry grinding the grain kernels to a coarse particle size such that 91–95% of said particles will pass through a No. 14 mesh screen; 80–90% will pass through a No. 20 mesh screen; and 40–56% will pass through a No. 45 mesh screen;
B. Forming a dough by mixing about one part by weight of said coarsely ground grain with an equal part of water and kneading together for about one half hour;
C. Allowing said dough to sit for about 15 minutes;
D. Separating the starch and gluten in said dough by subjecting said dough to the combined action of a water wash and mechanical shearing of the viscous gluten strands formed in the dough to expose additional starch to the wash streams;
E. Collecting the starch from said wash waters separately from the viscous gluten;
F. Separating the bran, fiber and germ from said starch; and
G. Separately collecting and drying said gluten from which substantially all of the starch, germ, bran and fiber have been removed to obtain a vital gluten product containing at least 75% protein.

2. The process of claim 1, in which the dry grinding of the grain particles is performed on an impact type hammermill provided with an arcuate slotted screen having openings in the size range of 0.028 inch to 0.046 inch through which the particles must pass before being collected.

3. The process of claim 2, in which the arcuate slotted screen has 0.046 inch openings, and the particles give the following screen size distribution:

|  | % Through |
| --- | --- |
| No. 14 mesh screen | 99 |
| No. 20 mesh screen | 94 |
| No. 45 mesh screen | 44 |

4. The process of claim 2, in which the arcuate slotted screen is provided with 0.028 inch openings, and the screen analysis is:

| No. 14 screen | 98 |
| --- | --- |
| No. 20 screen | 94 |
| No. 45 screen | 69 |

5. The process of claim 2, in which the cereal grain is wheat, and the screen analysis is:

|  | % Through |
| --- | --- |
| No. 14 | 97 |
| No. 20 | 84 |
| No. 45 | 56 |
| No. 100 | 31 |
| No. 140 | 23 |
| No. 200 | 17 | and the process yielded 58% prime grade starch; 12% by weight vital gluten having about 80% by weight protein, and about 22% by weight fiber.

6. The process of claim 1, in which the cereal grain is wheat, and the pH during dough forming and washing is allowed to seek its natural level in the range of 3–6.

7. The process of claim 6, in which the dough and wash pH are about 5.8.

8. The process of claim 1, which is performed using only water additions and removals with chemical additions, and the pH throughout the process is allowed to seek its natural level with no chemically induced adjustments.

9. The method of claim 1, in which the dry grinding frees substantially whole and intact germ particles from the cracked grain kernels.

10. The process of claim 1, in which the cereal grain is wheat, and the yield by weight is: 53% starch; at least 9% vital gluten having a protein analysis of at least 75% by weight; and about 29% bran, germ and fiber.

11. The process of claim 10, in which the dewatered bran, germ and fiber fraction has the following nutritional analysis (by weight): 9.4% protein; 2.8% fat; 3.8% ash; and 47.9% carbohydrate.

12. The process of claim 1, in which the separation of the starch and gluten is performed in a gluten washing device comprising an elongated, generally U-shaped trough disposed at an inclined angle of about 30° from the horizontal, a pair of oppositely flighted augers disposed in the trough, drive means for said augers, said augers being rotatably driven to rotate towards each other and downwardly when viewed from above, and adapted to mix, grind and shear said dough, an inlet for receiving said dough at the lower end of said trough, means for supplying water to said trough to wash said dough to carry away starch from the gluten in the dough, said water flowing downwardly through a wash water outlet disposed at the lower end of said trough, and a vital gluten outlet disposed at the upper end of said trough for passage therethrough, and collection of washed, vital gluten from which the major portion of starch has been removed.

* * * * *

UNITED STATES PATENT OFFICE
CERTIFICATE OF CORRECTION

Patent No. 3,857,987　　　　　　　　　　Dated December 31, 1974

Inventor(s) Saul Rogols, Edward J. Hueckel and John W. Salter

It is certified that error appears in the above-identified patent and that said Letters Patent are hereby corrected as shown below:

Column 4, line 3; for "equipment so" read ---equipment) so---
Column 8, line 17; for ".023"" read ---.028"---

Signed and sealed this 1st day of April 1975.

(SEAL)
Attest:

RUTH C. MASON
Attesting Officer

C. MARSHALL DANN
Commissioner of Patents
　　and Trademarks